(12) United States Patent
Oehler et al.

(10) Patent No.: US 8,131,439 B2
(45) Date of Patent: Mar. 6, 2012

(54) METHOD AND ELECTRONIC REGULATOR WITH A CURRENT MEASURING CIRCUIT FOR MEASURING THE CURRENT BY SENSE-FET AND SIGMA-DELTA MODULATION

(75) Inventors: Peter Oehler, Frankfurt am Main (DE); Axel Schmitz, Hattersheim (DE); Micha Heinz, Darmstadt (DE); Frank Michel, Rosbach v.d.Höhe (DE)

(73) Assignee: Continental Teves AG & Co. OHG (DE)

( * ) Notice: Subject to any disclaimer, the term of this patent is extended or adjusted under 35 U.S.C. 154(b) by 743 days.

(21) Appl. No.: 12/159,913

(22) PCT Filed: Jan. 9, 2007

(86) PCT No.: PCT/EP2007/050167
§ 371 (c)(1),
(2), (4) Date: Dec. 22, 2008

(87) PCT Pub. No.: WO2007/080163
PCT Pub. Date: Jul. 19, 2007

(65) Prior Publication Data
US 2009/0299592 A1 Dec. 3, 2009

(30) Foreign Application Priority Data

Jan. 10, 2006 (DE) .................... 10 2006 001 434
Jan. 3, 2007 (DE) .................... 10 2007 001 458

(51) Int. Cl.
*G06F 19/00* (2006.01)
*G01R 1/14* (2006.01)

(52) U.S. Cl. ............ 701/70; 701/36; 324/125; 324/120; 324/76.11

(58) Field of Classification Search .................... 701/70, 701/36; 324/125, 120, 76.11
See application file for complete search history.

(56) References Cited

U.S. PATENT DOCUMENTS

| 7,027,939 B2* | 4/2006 | Fey et al. ................ 702/64 |
| 2007/0152614 A1* | 7/2007 | Kifuku ................ 318/432 |
| 2008/0272732 A1* | 11/2008 | Schulz et al. ............ 318/811 |
| 2010/0301787 A1* | 12/2010 | Gallegos-Lopez et al. ............ 318/400.02 |
| 2011/0057645 A1* | 3/2011 | Jager et al. ............ 324/125 |
| 2011/0084638 A1* | 4/2011 | Patel et al. ............ 318/400.32 |

FOREIGN PATENT DOCUMENTS

| DE | 44 01 064 | 4/1995 |
| WO | WO 02/058967 A1 | 8/2002 |
| WO | WO 03/036787 | 5/2003 |
| WO | WO 03/039904 | 5/2003 |

* cited by examiner

*Primary Examiner* — Paul N Dickson
*Assistant Examiner* — Marlon Arce
(74) *Attorney, Agent, or Firm* — RatnerPrestia

(57) ABSTRACT

An electronic controller for motor vehicle control systems having at least one valve actuation circuit is described herein. The electronic controller uses pulse width modulation to control the load current ($i_L$) flowing through an essentially inductive load (L), and has at least one electronic current measuring circuit which has at least one analog/digital converter which converts an analog measurement signal for the load current ($i_L$) into a digital measurement signal for the load current ($i_L$). The at least one analog/digital converter is a sigma-delta modulator. A method for measuring current using sigma-delta modulation and to the use of the electronic controller in a motor vehicle brake system is also described herein.

17 Claims, 5 Drawing Sheets

Fig. 6

METHOD AND ELECTRONIC REGULATOR WITH A CURRENT MEASURING CIRCUIT FOR MEASURING THE CURRENT BY SENSE-FET AND SIGMA-DELTA MODULATION

This application is the U.S. national phase application of PCT International Application No. PCT/EP2007/050167, filed Jan. 9, 2007, which claims priority to German Patent Application No. DE102006001434.0, filed Jan. 10, 2006, and German Patent Application No. DE102007001458.0, filed Jan. 3, 2007, the contents of such applications being incorporated by reference herein.

BACKGROUND OF THE INVENTION

1. Field of the Invention

The invention relates to an electronic controller and to the use of the electronic controller in a motor vehicle brake system.

2. Description of the Related Art

In high-quality electronic ABS and ESP brake control systems, at least some of the valve coils are no longer switched but rather analogized actuation is effected using pulse width modulated current control (PWM), which permits almost analog actuation of the hydraulic valves. For this, a plurality of valve actuation circuits are provided which, by way of example, may be designed using MOS transistors connected in phase opposition. To allow an inexpensive and space-saving solution, such a valve actuation circuit is usually implemented as an integrated circuit, especially since a complex ESP system requires up to eight such valve actuation circuits to be present in addition to numerous additional circuit parts. A pure analog amplifier for actuating a valve coil is not feasible for reasons of excessive power loss.

The procedure when measuring the actual current using a single A/D converter within a PWM controller, for actuating the aforementioned valve coils is already revealed by WO02/058967 A2 (P 10057) and WO03/039904 A2 (P 10253). On the basis of the circuit examples described therein, a particular number of current measuring channels is allocated to the A/D converter in line with the time slice principle on the basis of complex priority logic, so that the conversion capacity of said A/D converter can be used in as optimum a fashion as possible. This priority logic is relatively complex and therefore expensive.

The demands on the above electronic control units are increasing to an ever greater extent, since additional functions are also undertaken by the brake control unit or the brake systems need to have improved control quality. A few more recent control functions, including motor vehicle longitudinal control (ACC), which keeps the distance from a vehicle in front constant, require not only the mere capability of setting an analog current but also particularly precise current control, since slightest deviations from the desired current value produce palpable differences in the set braking pressure, which means that precise ACC control with an appropriate level of comfort is no longer possible. In the case of prolonged ACC control, it is also possible for just slight differences between the set pressure in the front and rear axles to result in failure of the brake function on one axle. In particular, relatively small currents in the range from approximately 100 to 400 mA need to have a high level of precision, since these currents are needed for setting small pressure differences, as are typical for longitudinal control.

Figure 1:
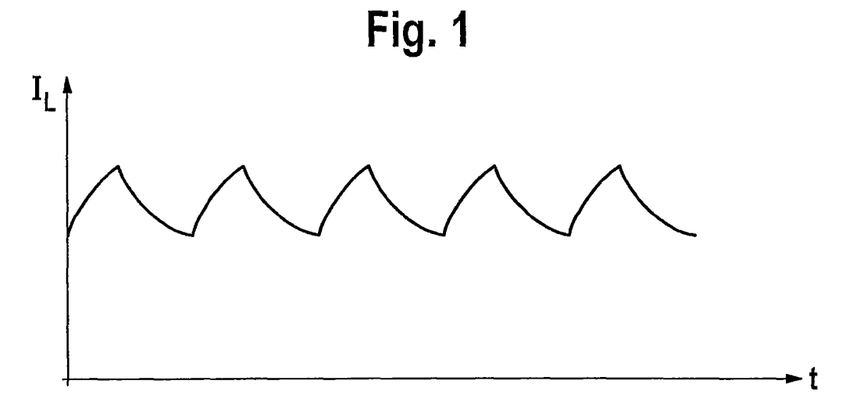
FIG. 1 shows the current profile through a PWM-controlled inductive load in a control circuit based on the prior art.

In the case of valve actuation circuits which are designed in line with the aforementioned patent applications WO02/058967 A2 (P 10057) and WO03/039904 A2 (P 10253), it is therefore necessary to improve the accuracy of the PWM current control still further. In the case of PWM control based on the cited prior art, a general consideration in the usual application of brake control is that an inductive load (e.g. valve coil) is actuated. The inductive load has a determined inductance L and a nonreactive resistance R. The inductance L can be used to define a time constant for the load L/R. On the basis of this time constant and the actuating frequency of the pulse width modulation, a typical profile is obtained for the load current $I_L$ for the inductive load over time t, as shown in FIG. 1. The use of an A/D converter, which is used on a number of occasions for measuring current in different valve actuation circuits, does not allow the current to be determined at a plurality of points in the current profile in FIG. 1. The current is therefore measured at particular times (discrete-time measurements), as described in the documents cited above. Depending on the measurement time, the current value determined in this manner deviates considerably from the current's average which actually needs to be determined for the PWM control. This deviation from the average is subsequently also referred to as a form error. If, as FIG. 2 shows, the current value is regularly measured in the middle of the switched-on phase at the time $t_{ON}/2$, for example, then the form error shown in FIG. 2 arises as the difference between the measured value and the average.

However, the form error is influenced not only by the measurement time for the discrete current measurement but also by other operating parameters for the PWM control, such as the voltage across the load and the temperature-dependent nonreactive resistance of the load at present. Integrated analog circuits, in particular, achieve a high level of absolute accuracy only with a very high level of outlay. Although inherently known differential circuit techniques and inherently known calibration techniques, for example, allow a certain degree of independence from technological fluctuations and temperature effects, these methods are subject to limits on account of the high level of outlay. Calibrating the circuit over temperature would require very long periods of time following production and therefore holds little advantage for production in large quantities.

Figure 2:
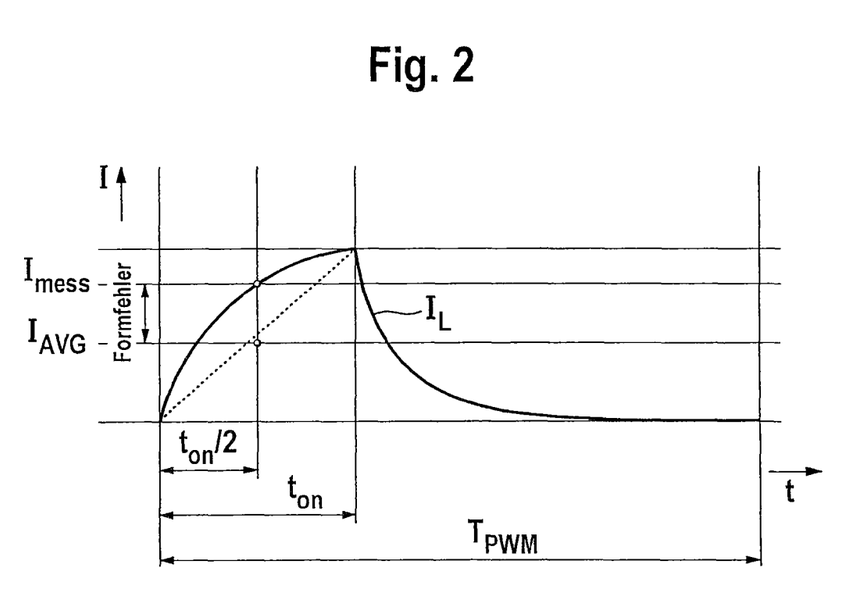
FIG. 2 shows just one PWM period from the current profile shown in FIG. 1 based on the prior art.

The current measuring principle shown in FIG. 2 requires a minimum value for the PWM signal's switched-on time so that in each period a current value can be recorded under all constraints. The result of this minimum value is that on the basis of the nonreactive resistance of the coil, the high-side voltage on the inductance and the set PWM frequency a minimum current is obtained below which no further control is possible. In the typical application of ACC control for motor vehicles, it is thus possible to regulate only currents to a minimum of 200 mA for example. However, ACC-optimized current/braking pressure characteristics for a valve coil usually require smaller currents down to approximately 100 mA.

An object of the present invention is thus to propose an electronic controller and a method for measuring current within an electronic controller, with PWM current control, which allow more accurate and safer current setting to be performed, the electronic controller needing to be relatively inexpensive, in particular.

SUMMARY OF THE INVENTION

According to aspects of the invention, the invention achieves the object by means of an electronic controller.

An idea of proposing an electronic controller for motor vehicle control systems having at least one electronic current measuring circuit which has at least one sigma-delta modulator which measures the load current flowing through an essentially inductive load by converting an analog measurement signal for the load current into a digital measurement signal for the load current is described herein.

The use of a sigma-delta modulator firstly has the advantage that a load current can be measured by oversampling an analog measurement signal for the load current, as a result of which a plurality of current values are recorded per PWM period and hence form errors can be reduced or prevented. Secondly, sigma-delta modulators are relatively inexpensive because their resolution is not dependent on the order but rather particularly on the clock rate at which they are operated, and hence it is also possible to use low-order modulators. It is thus preferable to use at least one 1-bit sigma-delta modulator for measuring current, which requires particularly few semiconductor elements, it is therefore reasonable and can nevertheless achieve high resolution by means of the clock rate. On account of the fact that such an analog/digital converter is relatively inexpensive, it is expediently possible to use at least one in each current measuring circuit, in particular one per PWM path, which means that complex and hence relatively expensive priority logic for actuating a single analog/digital converter using all the current measuring circuits which the controller contains becomes superfluous. It is also not necessary to use the relatively expensive precision resistor (shunt), since the currents is measured preferably directly, that is to say without converting the current into an appropriate voltage, by the sigma-delta modulator.

On account of the fact that the literature uses not only the terms "sigma-delta modulator" but also the term "delta-sigma modulator" for essentially identical analog/digital converters and there is no discernible standard opinion on the correct nomenclature, the term "sigma-delta modulator" is understood to mean both terms and possible technical embodiments which are attributed or can be attributed to one or both terms.

An output signal and signal transmission are also understood to mean a data signal and output data and data transmission.

A measurement signal for the load current is understood to mean a signal which is dependent on the load current and is preferably produced by scaling the load current, such as using a sense FET, and/or which is, in particular, a voltage signal which can be tapped off across a shunt through which the load current flows. Particularly preferably, this term covers signals which depict the time profile of a measured variable for the load current or are dependent on the load current in respect of at least one variable. Alternatively, the aforementioned term also covers the load current signal per se or preferably another signal which is dependent on the load current and which is provided for measuring the load current.

A valve actuation circuit is preferably understood to mean a circuit which controls at least the current through a valve, preferably a hydraulic valve, which is an essentially inductive electrical load. In this case, the valve actuation circuit uses pulse width modulation, in particular, and has at least one switch-on path with a power driver and a recirculation path with a power driver. Particularly preferably, a valve actuation circuit is understood to mean a PWM output stage.

A duty cycle is understood to mean the ratio of switched-on phase to PWM period length.

The at least one electronic current measuring circuit is preferably integrated in the at least one valve actuation circuit or is included in it.

The at least one sigma-delta modulator in the electronic current measuring circuit of the electronic controller expediently performs current measurement for the load current by oversampling the analog measurement signal for the load current, wherein the clock rate of the sigma-delta modulator is significantly higher than the frequency of the pulse width modulation. This measure largely prevents or reduces form errors.

The electronic current measuring circuit in the electronic controller preferably has at least one sense FET which provides the analog measurement signal for the load current directly or indirectly. In this case, the gate connection of the at least one sense FET is connected particularly to the gate connection of at least one power driver in the switch-on path or in the recirculation path. In addition, the drain connections and/or the source connections of the respective sense FET and of the respective power driver are connected or coupled to one another directly or indirectly. This form of the electronic current measuring circuit allows indirect current measurement, with the current which is actually to be measured turning out to be a defined factor smaller, which allows the measuring components to be designed not necessarily for power applications, or this is required only to an appropriately lower degree.

It is expedient for the at least one sigma-delta modulator to comprise, particularly for the given situation, a control loop which has an integrator element, particularly an integrator, particularly preferably a capacitor or another component or an electronic circuit with a corresponding electrical response, a comparator and a, in particular controllable, switchable current source. This switchable current source is particularly preferably designed such that it can drive various discrete current values and can be switched between these various current values. Most particularly preferably, this switchable current source comprises a parallel circuit comprising current sources whose currents can be added in a defined manner, and this process is preferably switchable, in particular.

The output of the at least one sigma-delta modulator is preferably connected to at least one averaging device. In particular, this averaging device is a counter element or alternatively an exponentially weighted moving average filter which behaves like a first-order digital low-pass filter. Particularly preferably, the counter element is a circuit which is designed or actuated such that it sums digital data. Such a counter or such a counter element implicitly performs averaging, since all data from a sigma-delta modulator are summed by it and hence taken into account per clock cycle.

The at least one electronic current measuring circuit in the electronic controller expediently has a switch-on path and a recirculation path, each of these paths having at least one sigma-delta modulator. Current measurement during the recirculation phase too allows current control to be performed with sufficient precision even for relatively small currents or relatively low duty cycles.

It is preferred for both the switch-on path and the recirculation path each to have at least one sense FET, these sense FETs being connected to a respective sigma-delta modulator directly or indirectly.

Preferably, the sigma-delta modulator in the switch-on path measures a current or records a current essentially only during the switched-on phase and the sigma-delta modulator in the recirculation path measures a current or records a current essentially only during the recirculation phase. This means that the current is measured or recorded separately during both phases.

The output signal from the sigma-delta modulator, that is to say the digital measurement signal for the load current, in the switch-on path and the output signal from the sigma-delta modulator in the recirculation path are expediently supplied to a common averaging device which processes the output signals from both paths, or the electronic current measuring circuit is designed accordingly. The effect achieved by this measure is that the two current measurements are totaled, this essentially corresponding to totaling of the two measured currents from both PWM paths in the analog domain. The at least one electronic current measuring circuit has, in particular, at least one circuit means for channel switching, particularly preferably a multiplexer, which is designed such that the signal transmission for the output signal from the respective sigma-delta modulator in the two PWM paths to the common averaging device is effected on the basis of the PWM phase. That is to say that during the switched-on phase the relevant sigma-delta modulator in the switch-on path measures or records the load current, and the output signal from this sigma-delta modulator is transmitted or connected to the common averaging device via this circuit means for channel switching. The behavior is similar with the output signal from the sigma-delta modulator in the recirculation path during the recirculation phase.

The electronic controller is preferably designed such that it assesses the data content of one or more averaging device(s) at least at defined times, after one or more PWM periods, and uses these data to calculate the load current, that is to say the current through the essentially inductive load, directly or indirectly. This implements averaging and undersampling, which smoothes the measurement signal. In addition, the volume of data used for calculating the current in this way is large enough to suppress a form error relatively effectively as a result of the averaging.

The at least one electronic current measuring circuit is preferably designed such that the output signal from the respective sigma-delta modulator in the two PWM paths is additionally transmitted to a respective additional averaging device. These additional data for the current measurement in the respective PWM path are transmitted to an evaluation unit for failsafe or plausibility checking purposes only at defined times or, when there is a defined volume of data, particularly a defined counter reading, according to the design of the electronic current measuring circuit and/or the design of the electronic controller. Particularly preferably, the respective additional averaging device comprises a first counter element, which counts the "ones" from the respective sigma-delta modulator, and a second counter element, which counts the number of samples or the number of digital output data items. The first counter reading, which in principles sums the "ones", and the second counter reading, which records and sums the number of corresponding samples, are used to form an average which is used to calculate a current value for failsafe purposes. In comparison with this, the common averaging device quite particularly preferably contains only one counter element, which sums the "ones" from both PWM paths. This involves averaging over the defined number of samples from a PWM period or a multiple thereof. On account of the fact that the number of these samples is known, no further counter element is required. The additional data from the additional averaging devices are read for failsafe purposes preferably as part of the inventive method by the software of a microcontroller.

It is expedient that the at least one electronic current measuring is designed such that when very small duty cycles occur, particularly preferably a duty cycle of below 15%, respectively, particularly within at least one defined number of PWM periods, the power driver in the switch-on path is switched on at defined times for a relatively short, defined period in order to increase the volume of data in the current measurement in the switch-on path.

Preferably, the at least one electronic current measuring circuit is designed such that when very large duty cycles occur, particularly preferably a duty cycle of above 85%, respectively, particularly within at least one defined number of PWM periods, the power driver in the switch-on path is switched off at defined times for a relatively short, defined period in order to increase the volume of data in the current measurement in the recirculation path.

Preferably, the at least one electronic current measuring circuit is designed such that the data from at least one averaging device, particularly a counter, are evaluated only at least every three PWM periods in order to increase the size of the database for the current measurement in respect of averaging and thereby to reduce the disturbance to the current control, particularly preferably on account of intentional disturbances for measuring purposes.

The at least one electronic current measuring circuit is preferably designed such that each PWM period contains at least one at least very short switched-on phase and/or likewise each PWM period contains at least one at least very short recirculation phase. In particular, at least one, particularly preferably each, valve actuation circuit is designed accordingly.

It is preferred for at least one electronic current measuring circuit to be in the form of an integrated circuit and particularly to be integrated in the electronic controller, which is also in the form of an integrated circuit.

A method for measuring current in an electronic controller for motor vehicle control systems, wherein sigma-delta modulation in at least one signal path of an electronic current measuring circuit is used to convert an analog measurement signal for a load current into a digital measurement signal for the load current is described herein. In this case, current measurement is preferably performed using the sigma-delta modulation.

It is expedient that the digital measurement signal for the load current in a switch-on path and the digital measurement signal for the load current in a recirculation path is/are respectively summed individually and/or together within a PWM period or a plurality of PWM periods and that this at least one sum is used to calculate a common current value which is taken as a basis for the actual current control. In particular, the digital measurement signals for the load current in the two PWM paths are additionally each summed separately and are particularly preferably stored after a defined time and/or when at least one defined volume of data is present. These additional current measurement data from the respective individual PWM paths are most particularly preferably used for plausibility checking purposes and/or failsafe purposes and evaluated in a microcontroller.

The features of the electronic controller and the features of the exemplary embodiments described are preferably also features which can be implemented in the course of the method.

The electronic controller described herein may be utilized in a motor vehicle control system.

The electronic controller and the method of use thereof are preferably used in electronic motor vehicle brake systems, in which electromagnetic hydraulic valves are actuated by means of pulse width modulation in valve actuation circuits, for setting the hydraulic pressure in wheel brakes on the motor vehicle. Alternatively, provision may be made for them to be used in a servo-assisted steering system in a motor vehicle, wherein the inventive electronic controller actuates the at least one hydraulic valve.

These and other aspects of the invention are illustrated in detail by way of the embodiments and are described with respect to the embodiments in the following, making reference to the Figures.

DETAILED DESCRIPTION OF THE PREFERRED EMBODIMENTS

Figure 3:
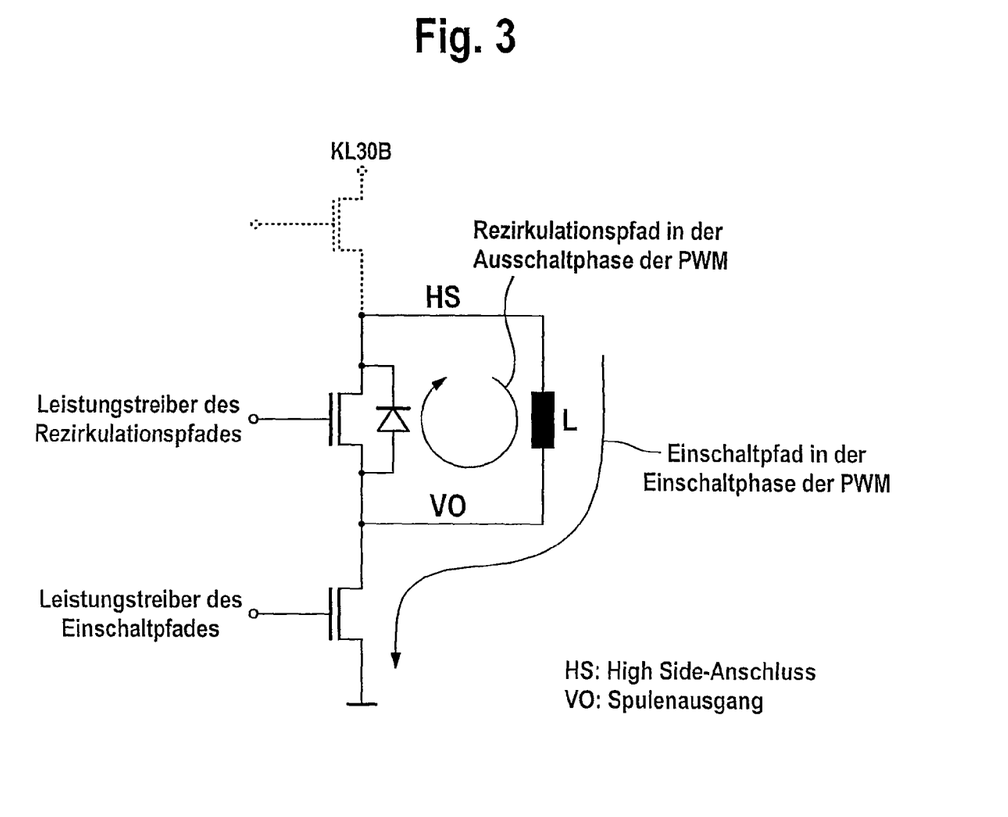
FIG. 3 shows a schematic illustration of a valve actuation circuit with a recirculation path based on the prior art.

The schematic illustration of a valve actuation circuit with a power driver in the switch-on path and a power driver in the recirculation path which is shown in FIG. 3 is used to explain the illustrated currents during PWM actuation of the inductive load L. The power driver in the switch-on path is used to connect load L to ground, as a result of which the coil current rises exponentially when the maximum current has not yet been reached. When the PWM actuation is in the switched-off state, the power driver in the recirculation path is on, which means that the coil's transient decay current can flow via the recirculation path. This causes the current to decay exponentially.

Figure 4:
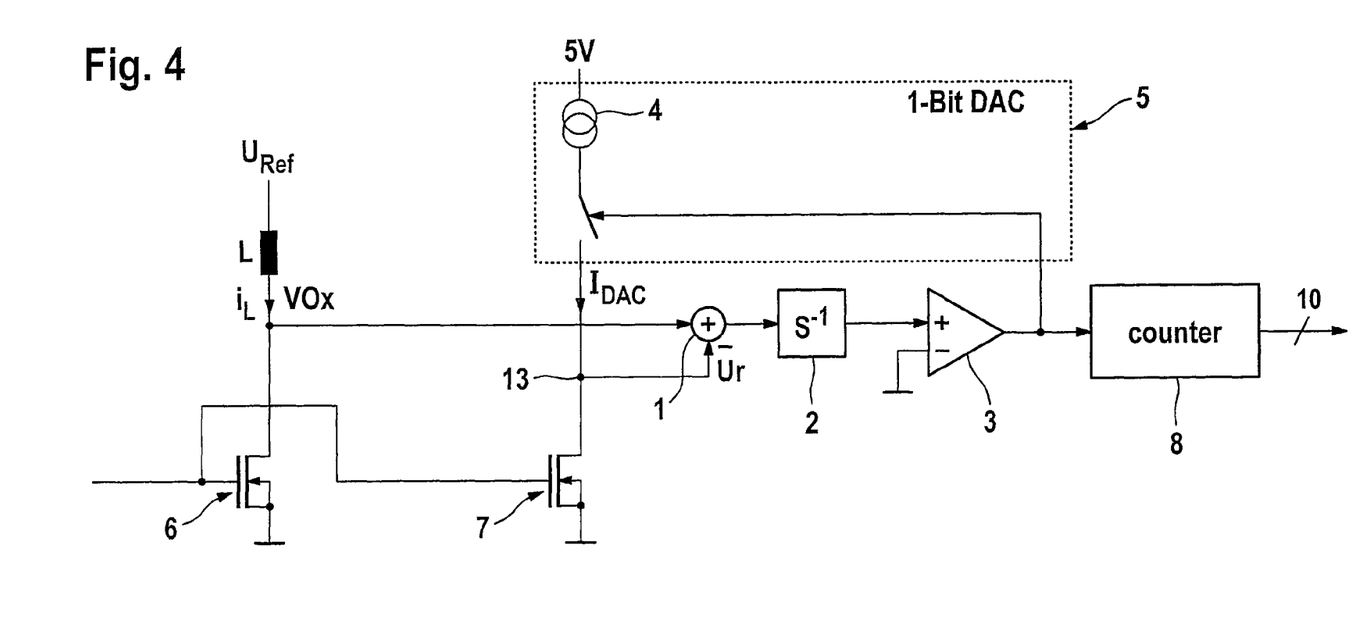
FIG. 4 shows an exemplary embodiment of the electronic current measuring circuit in the electronic controller for the switch-on path.

FIG. 4 schematically shows an exemplary embodiment of the electronic current measuring circuit in the electronic controller. In this arrangement, this current measuring circuit comprises only the current measurement in the switch-on path of a valve actuation circuit. Load current $i_L$, which is established on the basis of the voltage $U_{Ref}$ across the inductance L and the channel resistance of the power driver 6 to ground when the power driver 6 in the switch-on path is on, and which flows through the inductance L, is intended to be measured. In this case, inductance L corresponds to the inductive behavior of a valve coil. Potential VOx is on the node between L and the power FET. Potential VOx is the reference variable for a control loop connected thereto. The latter contains a summing point 1 at which the reference variable VOx and the feedback variable $U_r$ engage, the negative feedback meaning that a difference between these two variables VOx and $U_r$ is formed at summing point 1. By way of example, the summing point 1 is in the form of an analog summator which is provided by an operational amplifier circuit. The summing point 1 has an integrator 2 connected to it which is used as a controller and whose output forms the input potential for the comparator 3 relative to ground. The comparator 3 is part of the control path of the control loop and is operated in clocked fashion, for example. The output of the control loop is fed back via a 1-bit DAC 5. In this arrangement, the 1-bit DAC is in the form of a switchable current source 4 which drives a defined reference current through a sense FET 7 to ground. This sense FET 7 is on in a control situation and has a defined channel resistance, on the basis of which an appropriate voltage $U_r$ is on the node between the 1-bit DAC 5 and the sense FET 7, said voltage being applied to the summing point 1 in an inverted form as a feedback variable, as a result of which appropriate negative feedback for the control loop is achieved. The gate connections of the power driver 6 and of the sense FET 7 are connected to one another, which means that these two transistors are actuated together, that is to say that the control loop is in operation only when the power driver 6 is on. By way of example, the sigma-delta modulation is performed at a frequency which is 256 times as high as the frequency of the PWM. This corresponds to 256-fold oversampling. To this end, the comparator 3 is operated in clocked fashion at this oversampling frequency. Not only does the output signal from the comparator 3 actuate the switchable current source 4, but these output data are also transmitted to a counter 8 and stored therein. In this arrangement, the counter 8 counts each "1" from the comparator output. In each PWM period, the counter reading, which has a data word length of 10 bits, for example, is transmitted to an evaluation unit which can take this data word and calculate a current value. By way of example, this current value relates only to the current recorded during the pulse width modulation's switched-on phase, however. Storing or summing the data words (samples) in the counter 8 corresponds to averaging as part of the current measurement. The subsequent undersampling is carried out by reading the counter 8 in time with the PWM. In the figurative sense, the averaging smoothes the current measurement. This is comparable to analog low-pass filtering of the current $i_L$ which is to be measured.

As described below by way of example, the proportioning of the measurement range of the current measuring circuit can be chosen: the mirror ratio or the ratio of the drain/source channel resistances (W/L ratio) of the power driver 6 to the sense FET 7 is 500. If the aim is now to measure a current up to a top measurement range limit of 2A, the switchable current source 4 needs to output a current of 4 mA. In respect of these values, a measurement range of 2A is obtained by means of the control loop of the sigma-delta modulator. The design of the current source is thus crucial for determining the measurement range. In an exemplary embodiment which is not shown, the switchable current source 4 is designed as a controllable current source for the purpose of setting the measurement range. In one exemplary embodiment which is likewise not shown, an additional, connectable current source or an additional connectable parallel circuit comprising current sources is connected to node 13, between the switchable current source 4 and the drain connection of the sense FET 4. This current source or these current sources allow(s) the measurement range of the current measuring circuit to be altered, or for example extended, and connection and disconnection of additional current sources thus implements range switching.

In one exemplary embodiment which is not shown, the integrator 2 is provided by a capacitor having a defined capacitance.

Figure 5:
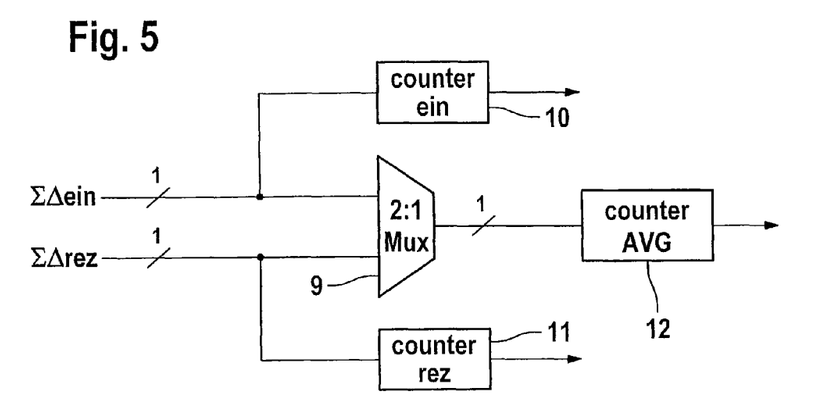
FIG. 5 shows an exemplary electronic current measuring circuit in the electronic controller which has circuit elements for evaluating both measurement paths.

FIG. 5 shows a schematic exemplary embodiment of an extended electronic current measuring circuit. In this arrangement, both in the switch-on path and in the recirculation path the load current is recorded indirectly (in a manner which is not shown) by means of a sigma-delta modulator. The data words from respective sigma-delta modulators are transmitted bit by bit via a respective line to the illustrated portion of the current measuring circuit, the data signal ΣΔon corresponding to the output of the sigma-delta modulator in the switch-on path and the data signal ΣΔrec corresponding to the output of the sigma-delta modulator in the recirculation path. These two data signals are supplied to the multiplexer 9. The multiplexer 9 is actuated (not illustrated) such that the respective input channel for the path which is currently active is switched on, that is to say the data signal ΣΔon is switched on during the switched-on phase of the PWM and hence during active current recording for the switch-on path, and the data signal ΣΔrec is accordingly switched on during the recirculation phase of the PWM. The output of the multiplexer 9 is connected to a counter 12 which sums and stores the data words from both current recording paths and hence both sigma-delta modulators. The summing of the data signals or samples from both PWM current measuring paths corresponds to summation of both measured currents from the two PWM paths in the analog domain. In addition, the counter 12 forms a general average for the recorded current. By way of example, this average is transmitted to an evaluation circuit or read therefrom every two PWM periods. In this case, the counter reading z is a proportion of a number $z_{max}$ which is obtained from the sum of all possible "1" data words. With 256-fold oversampling and transmission of the counter value on the counter 12 every two PWM periods, respectively, $z_{max}$ is obtained as 512. The measured current value is obtained from the quotient $z/z_{max}$ multiplied by the top limits of the measurement range for the two sigma-delta modulators in the two PWM paths. In addition, the data signals ΣΔon and ΣΔrec are respectively supplied to a further counter 10, 11. By way of example, the data words from these two counters 10, 11 are stored in a memory unit at defined times or when particular data words arise. The memory units are read by the software, these data, which contain information regarding the recorded current in the respective separate PWM paths, being used for failsafe purposes or for plausibility checking.

Figure 6:
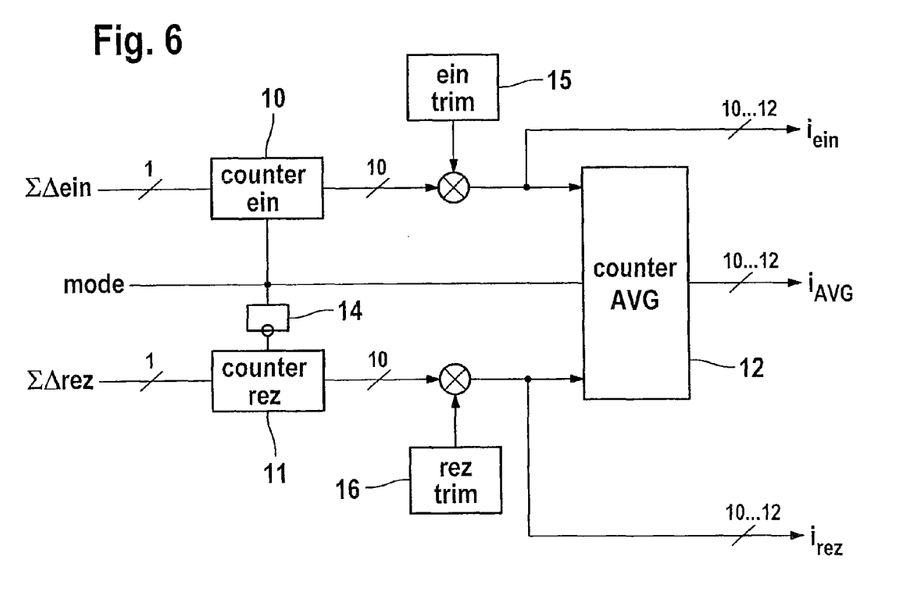
FIG. 6 shows an alternative exemplary electronic current measuring circuit in the electronic controller, with trimming elements.

FIG. 6 shows an exemplary embodiment of the electronic current measuring circuit, which has a respective separate counter 10, 11 for the data signals from the two sigma-delta modulators ΣΔon and ΣΔrec. These two counters are in a form such that they can store the current measurement data which are captured during a complete PWM period. In addition, this exemplary current measuring circuit has the capability of trimming. This trimming is parameterized in a test mode, for example during production or during the subsequent testing of the current measuring circuit. To test the current measuring circuit, a defined, constant test current is set in the load path. The current measurement in both PWM paths produces a measured current value. In this case, the current measurement in both PWM paths can take place in succession or alternately. Experience has shown that the deviation of the measured current from the defined, constant test current is primarily attributable to an imprecise mirror ratio for the respective power stage to the respective sense FET and/or to an imprecisely set or proportioned current source. The deviation is evaluated during parameterization of the trimming as a correction factor, this correction factor multiplied by the measured current giving the true current value. This correction factor is respectively stored for the switch-on path and the recirculation path in a memory element 15, 16, for example a ROM. In the exemplary electronic current measuring circuit, the output of the two counters 10 and 11 is respectively multiplied by the correction factor from the memories 15 and 16. These two data signals are respectively supplied to a common counter 12 and also individually to a failsafe current measuring section. The transmission of the data to the counter 12 is controlled by means of a signal 'mode', which contains the information about whether the switch-on path or the recirculation path, including the respective current measuring path, is currently active. In this context, the signal for the counter 10 is inverted by the inverter 14, the effect achieved by which is that only one counter 10, 11 at a time transmits its data. In addition, the signal 'mode' is connected to the counter 12. Furthermore, an evaluation device uses the signal 'mode' or its time profile to calculate the size of the duty cycle per respective PWM period. The actuation of the counters 10, 11, 12 is comparable to a multiplex operation. By way of example, the data word from the counter 12 is read every two PWM periods and is used for calculating a current value in an evaluation device. This calculation involves weighting the two data signals from the respective PWM paths in terms of the size of the duty cycle (duty cycle weighted average). By way of example, the data word from the switch-on path is multiplied by the duty cycle and the data word from the recirculation path is multiplied by "1-duty cycle", and these two products are then added.

In an exemplary embodiment which is not shown, the evaluation device is integrated in the counter 12 or alternatively integrated individually or together with the electronic current measuring circuit in the electronic controller, or implemented as software.

Figure 7:
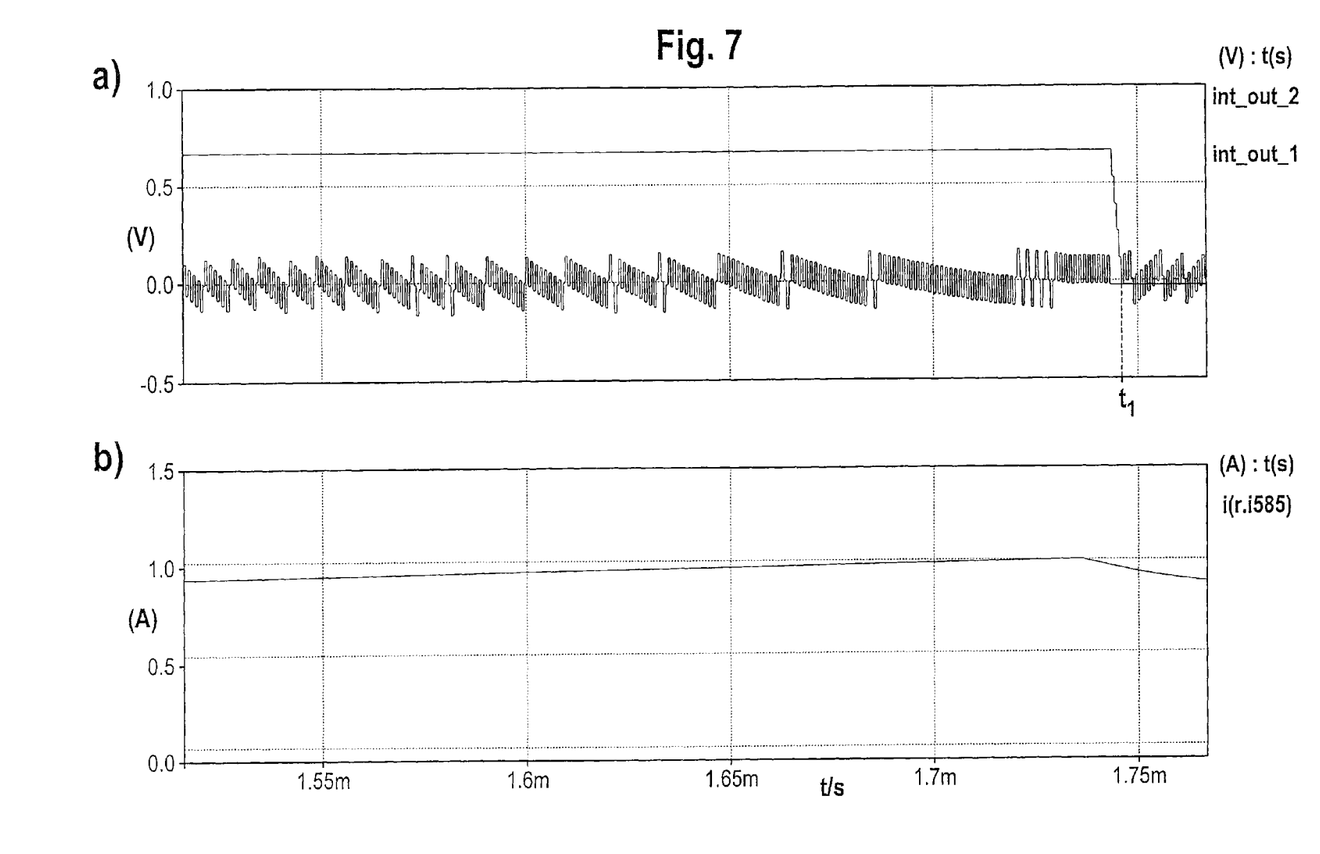
FIG. 7 shows the exemplary time profiles for the voltage on the integrator in the current measuring circuit and for the corresponding load current which is to be measured.

The top graph a) in FIG. 7 illustrates the voltage waveform on the integrator of the sigma-delta modulator. The bottom graph b) shows the load current to be measured as a function of time. The voltage profile under a) shows how the voltage potential rises over a certain period on the integrator, this occurring on the basis of the current to be measured and the change in the current to be measured. When the voltage potential on the integrator reaches a defined relative threshold value, the switchable current source within the control loop is switched on and a negative voltage potential, resulting from the current from the switched current source through the sense FET, is applied to the node of the control loop, the result being an abrupt change in the voltage value, as illustrated. Each sudden voltage change in FIG. 7a) therefore corresponds to a "1" at the data output of the sigma-delta modulator. At the time $t_1$, FIG. 7a) shows the voltage profile on the integrator changing between the switch-on path ($t<t_1$) and the recirculation path ($t>t_1$).

The invention claimed is:

1. An electronic controller for motor vehicle control systems having at least one valve actuation circuit that uses pulse width modulation (PWM) to control a load current ($i_L$) flowing through an inductive load (L), and having at least one electronic current measuring circuit which has at least one analog/digital converter which converts an analog measurement signal for the load current ($i_L$) into a digital measurement signal for the load current ($i_L$), wherein the at least one analog/digital converter is a sigma-delta modulator.

2. The electronic controller as claimed in claim 1, wherein at least one signal-delta modulator in the electronic current measuring circuit performs current measuring for the load current ($i_L$) by oversampling the analog measurement signal for the load current ($i_L$), wherein a clock rate of the sigma-delta modulator is greater than a frequency of the pulse width modulation.

3. The electronic controller as claimed in claim 1, wherein the electronic current measuring circuit has at least one sense-FET which provides the analog measurement signal for the load current ($i_L$) either directly or indirectly.

4. The electronic controller as claimed in claim 3, wherein a gate connection of the at least one sense-FET is connected to a gate connection of at least one power driver in a switch-on path or in a recirculation path, and drain connections, source connections, or a combination of drain connections and source connections of a respective sense-FET and of a respective power driver are connected or coupled to one another either directly or indirectly.

5. The electronic controller as claimed in claim 1, wherein the sigma-delta modulator comprises a control loop which has an integrator element, a comparator and a controllable, switchable current source.

6. The electronic controller as claimed in claim 1, wherein an output of the sigma-delta modulator is connected to at least one averaging device.

7. The electronic controller as claimed in claim 6, wherein the averaging device is a counter element.

8. The electronic controller as claimed in claim 1, wherein at least one electronic current measuring circuit has a switch-on path and a recirculation path and each of the paths has at least one sigma-delta modulator.

9. The electronic controller as claimed in claim 8, wherein both the switch-on path and the recirculation path each have at least one sense-FET, the at least one sense-FET being either directly or indirectly connected to a respective sigma-delta modulator.

10. The electronic controller as claimed in claim 8, wherein the sigma-delta modulator in the switch-on path measures a current only during a switched-on phase and in that the sigma-delta modulator in the recirculation path measures a current only during a recirculation phase.

11. The electronic controller as claimed in claim 7, wherein an output signal from the sigma-delta modulator in a switch-on path and an output signal from the sigma-delta modulator in a recirculation path are supplied to a common averaging device which processes output signals from the switch-on path and the recirculation path.

12. The electronic controller as claimed in claim 11, wherein the at least one electronic current measuring circuit has at least one circuit means for channel switching that is configured to effect a signal transmission for the output signal from a respective sigma-delta modulator in the switch-on path and the recirculation path to the common averaging device based upon a pulse width modulation phase.

13. The electronic controller as claimed in claim 6, wherein the electronic controller is configured to assess data content of at least one averaging device at least at defined times, after one or more pulse width modulation periods, and the electronic controller is further configured to use the data content to calculate the load current ($i_L$) either directly or indirectly.

14. The electronic controller as claimed in claim 8, wherein at least one electronic current measuring circuit is configured to transmit an output signal from a respective sigma-delta modulator in the switch-on path and the recirculation path to a respective additional averaging device.

15. A method for measuring current in an electronic controller for motor vehicle control systems using pulse width modulation in at least one valve actuation circuit to control a load current ($i_L$) flowing through an inductive load (L), the method comprising the steps of:

converting an analog measurement signal for the load current ($i_L$) into a digital measurement signal by an analog/digital converter in at least one signal path of an electronic current measuring circuit, and performing analog/digital conversion by sigma-delta modulation.

16. The method as claimed in claim 15, further comprising the steps of:

summing a digital measurement signal for the load current ($i_L$) in a switch-on path and a digital measurement signal for the load current ($i_L$) in a recirculation path individually and/or together within a pulse width modulation period or a plurality of pulse width modulation periods, and calculating a common current value that is taken as a basis for the actual current control based upon a result of said summing step.

17. Use of the electronic controller as claimed in claim 1 in a motor vehicle brake system.

\* \* \* \* \*